US006679845B2

(12) United States Patent
Ritter et al.

(10) Patent No.: US 6,679,845 B2
(45) Date of Patent: Jan. 20, 2004

(54) HIGH FREQUENCY SYNTHETIC ULTRASOUND ARRAY INCORPORATING AN ACTUATOR

(75) Inventors: Timothy Adam Ritter, Bellefonte, PA (US); K. Kirk Shung, State College, PA (US); Thomas R. Shrout, Port Matilda, PA (US)

(73) Assignee: The Penn State Research Foundation, University Park, PA (US)

( * ) Notice: Subject to any disclaimer, the term of this patent is extended or adjusted under 35 U.S.C. 154(b) by 221 days.

(21) Appl. No.: 09/928,539

(22) Filed: Aug. 13, 2001

(65) Prior Publication Data

US 2002/0050169 A1 May 2, 2002

Related U.S. Application Data

(60) Provisional application No. 60/228,967, filed on Aug. 30, 2000, and provisional application No. 60/271,820, filed on Feb. 27, 2001.

(51) Int. Cl.[7] ................................................ A61B 8/00
(52) U.S. Cl. ...................................................... 600/444
(58) Field of Search ........................ 600/437, 443–447, 600/459, 463–471

(56) References Cited

U.S. PATENT DOCUMENTS

| | | | | |
|---|---|---|---|---|
| 5,186,177 A | * | 2/1993 | O'Donnell et al. | 600/463 |
| 5,291,893 A | * | 3/1994 | Slayton | 600/444 |
| 5,505,088 A | * | 4/1996 | Chandraratna et al. | 600/466 |
| 5,673,699 A | * | 10/1997 | Trahey et al. | 600/447 |
| 5,704,361 A | * | 1/1998 | Seward et al. | 600/459 |
| 6,110,121 A | * | 8/2000 | Lenker | 600/463 |

OTHER PUBLICATIONS

"A Digital Synthetic Force Acoustic Immaging System For NDE", P. D. Corl, P. M. Grant, and G. S. Kino, Edward L. Ginzton, Lab Stanford University, 1978.

"Efficient Synthetic Aperture Imaging From A Circular Aperture With Possible Application To Catheter–Based Imaging", IEEE Transactions on Ultrasonics, Ferroelectrics, and Frequency Control, vol. 39, No. 3, May 1992.

"Synthetic Receive Aperture Imaging With Phase Correction For Motion And For Tissue Inhomogeneties—Part I: Basic Principles", IEEE Transactions on Ultrasonics, Ferroelectrics, and Frequency Control, vol. 39, No. 4, Jul. 1992.

(List continued on next page.)

Primary Examiner—Francis J. Jaworski
(74) Attorney, Agent, or Firm—McKee, Voorhees & Sease, P.L.C.

(57) ABSTRACT

The present invention discloses a method and apparatus for ultrasound imaging with improved spatial sampling. The device includes a plurality of ultrasound imaging elements each having a pitch defined by the center to center spacing of the ultrasound imaging elements; and a motion mechanism operatively connected to the plurality of ultrasound imaging elements and adapted to move the plurality of ultrasound imaging elements over a distance to increase the spatial sampling of the plurality of ultrasound imaging elements. The method of the present invention includes transducing a signal from one or multiple ultrasound imaging elements within an array of ultrasound imaging elements; moving the array of ultrasound imaging elements a distance less than the pitch; and transducing at least one additional signal from the ultrasound imaging element.

31 Claims, 5 Drawing Sheets

OTHER PUBLICATIONS

"Ultrasound Synthetic Aperture Imaging: Monostatic Approach", IEEE Transactions on Ultrasonics, Ferroelectrics, and Frequency Control, vol. 41, No. 3, May 1994.

"Synthetic Aperture Imaging For Small Scale Systems", IEEE Transactions on Ultrasonics, Ferroelectrics, and Frequency Control, vol. 42, No. 2, Mar. 1995.

"A 100–MHz Ultrasonic Transducer Array Using ZnO Thin Films", IEEE Transactions on Ultrasonics, Ferroelectrics, and Frequency Control, vol. 42, No. 2, Mar. 1995.

"Catheter Arrays: Can Intravascular Ultrasound Make A Difference In Managing Coronary Artery Disease", 1997 IEEE Ultrasonics Symposium—1447.

"Synthetic Aperture Techniques With A Virtual Source Element", IEEE Transactions on Ultrasonics, Ferroelectrics, and Frequency Control, vol. 45, No. 1, Jan. 1998.

"Real–Time 3–D Ultrasound Imaging Using Sparse Synthetic Aperture Beamforming", IEEE Transactions on Ultrasonics, Ferroelectrics and Frequency Control, vol. 45, No. 4, Jul. 1998.

"Laser Micromachined High Frequency Ultrasonic Arrays", 1999 IEEE Ultrasonics Symposium—1209.

"Mineaturized Circular Array", Joerg Schulze–Clewing, Michael J. Eberle, Douglas N. Stephens, EndoSonics Corporation, a JOMED Company, Rancho Cordova, CA.

* cited by examiner

HIGH FREQUENCY SYNTHETIC ULTRASOUND ARRAY INCORPORATING AN ACTUATOR

CROSS-REFERENCE TO RELATED APPLICATIONS

This application claim priority from U.S. Provisional Application Serial No. 60/228,967 filed on Aug. 30, 2000 titled MICRO-INDEXED HIGH FREQUENCY ULTRASOUND IMAGING ARRAY and U.S. Provisional Application Serial No. 60/271,820 filed Feb. 27, 2001 titled A HIGH FREQUENCY SYNTHETIC ULTRASOUND ARRAY INCORPORATING AN ACTUATOR. The disclosure of both of these provisional applications is hereby specifically incorporated by reference.

GRANT REFERENCE

Work for this invention was funded in part by a grant from the NIH, Technology Resource Grant No. P41-RR11795. The government may have certain rights in this invention.

BACKGROUND OF THE INVENTION

1. Field of the Invention

The present invention relates to ultrasound imaging. More particularly, although not exclusively, the present invention relates to high frequency ultrasound imaging for use in medical applications.

2. Problems in the Art

Ultrasound imaging is widely used in non-destructive evaluation and testing, including medical applications. In ultrasound imaging, typically a probe having ultrasound transducers is used to create sounds and then listen for echos. The received signals of the echos are then analyzed or otherwise processed to create images or for other analysis.

The frequency used is related to the depth of the imaging, so the frequency of the ultrasound used will vary from application to application. For example, high frequency applications such as frequencies over 30 MHz have been found to be useful in various medical applications such as, but not limited to, ophthalmology, dermatology, intravascular imaging, small animal imaging, and intraoperative/laproscopic applications (F. S. Foster, C. J. Pavlin, K. A. Harasiewicz, D. A. Christopher, and D. H. Turnbull, "Advances in ultrasound biomicroscopy," *Ultrasound Med. Biol.*, vol. 26, pp. 1–27, 2000). The frequency is proportional to the resolution, therefore these higher frequencies also result in the ability to resolve small structures.

There are various types or configurations of ultrasound transducers. For example, mechanically scanned single element transducers have been used at high frequencies (i.e. frequencies greater than 30 MHz). In addition, linear arrays of ultrasound transducers or elements have been used, typically at much lower frequencies. Using multiple ultrasound elements increases the speed at which imaging can occur. Imaging arrays capable of operation at high frequencies are not available. Instead, mechanically scanned single-element transducers are used to acquire the pulse-echo data at this frequency. Improved performance could theoretically be obtained with an array, however, the high frequency puts a physical limitation on the size of the device.

In ultrasound arrays, typically the elements are spaced at half wavelength intervals for phased arrays and at full wavelength intervals for linear arrays. The center to center spacing of the elements in these arrays is known as pitch. To achieve high frequencies, according to prior art methodologies, the element spacing must be reduced. However, current interconnect and fabrication techniques do not permit element spacing of less than 50 micrometers. In addition, the size of the transducers must also decrease. Since capacitance and frequency are inversely related, high frequencies lead to low capacitance of the elements and low signal-to-noise ratios. Therefore, imaging arrays operating at high frequencies have not been used. In addition, other problems in implementation would occur. These include the cost and complexity of a beamformer with high channel counts that is also capable of performing appropriately despite electrical and acoustic cross talk considerations. Therefore, problems remain.

An ideal solution would be to decrease the number of active channels, to increase the width of the elements, to increase the center-to-center element distance (pitch), to increase the separation between elements, and to accomplish these goals while still obtaining sampling rates and signal-to-noise ratios suitable for imaging.

Therefore, it is a primary object of the present invention to provide for an ultrasound-imaging array that improves upon the state of the art.

It is a further object of the present invention to provide an ultrasound-imaging array that allows for a decreased number of active channels.

Another object of the present invention is the provision of an ultrasound-imaging array that allows the width of the elements to increase.

Yet another object of the present invention is an improved ultrasound-imaging array that allows the center-to-center element distance to increase.

A still further object of the present invention is to provide an ultrasound-imaging array that allows for increased separation between elements.

Another object of the present invention is to provide an improved ultrasound-imaging array that provides for sampling rates and signal to noise ratios suitable for imaging.

A still further object of the present invention is an improved ultrasound-imaging array that is capable of use at frequencies at or above 30 MHz.

These and other objects, features, or advantages of the present invention will become apparent from the Specification and Claims.

BRIEF SUMMARY OF THE INVENTION

According to the present invention, in order to overcome problems in the art, a motion mechanism is combined with an imaging array. The motion mechanism may be an actuator. The actuator moves the imaging array. The actuator may be moved in short, precise, incremental steps to increase spatial sampling density. Alternatively, the actuator may move continuously as imaging occurs.

One aspect of the present invention relates to a device for ultrasound imaging at high frequencies with improved spatial sampling. The device includes a plurality of ultrasound imaging elements each having a pitch defined by the center-to-center spacing of the ultrasound imaging elements. The device also includes an actuator operatively connected to the plurality of ultrasound imaging elements and adapted to move the plurality of ultrasound imaging elements over a distance significantly less than the total length of the array and for the expressed purpose of enabling increased spatial sampling. The distance may be defined as a series of incremental steps which the actuator moves. Alternatively, the actuator's movement can be continuous instead of discrete. Preferably, a synthetic aperture software beamformer is used to reconstruct an image from the pulse-echo data.

Another aspect of the present invention involves a method. According to this aspect of the present invention, the method of ultrasound imaging includes transducing a plurality of signals from a plurality of ultrasound imaging elements, moving the plurality of ultrasound imaging elements an incremental distance, and repeating the steps of transducing and moving one or more times. The total distance moved is the sum of each incremental distance and is significantly less than the total length of the array. Alternatively, the actuator's movement can be continuous instead of discrete. The movement enables increased spatial sampling and allows an array with a large pitch, defined by the center-to-center spacing of the ultrasound imaging elements, to mimic the performance achieved with a much smaller pitch. Pulse-echo data is obtained at each position and this data is then used to create an image, such as through synthetic aperture processing.

The present invention creates a number of advantages. It allows for imaging at high frequencies. It simplifies the hardware needed through lowering the number of active channels required. Further, this approach can use imaging elements of dimensions that are within current day manufacturing processes.

DETAILED DESCRIPTION OF THE INVENTION

The description that follows is related to one embodiment of the present invention. It is to be understood that the present invention is not limited merely to this description, but only to that which is claimed. For purposes of explanation and discussion, the present invention is described in a particular environment. The description of the present invention provides for use in a biomedical-related environment. Ultrasound imaging is widely used in biomedical applications and the present invention provides advantages in this environment. The present invention contemplates, however, that the present invention may be used in other environments and for other applications.

Figure 1:
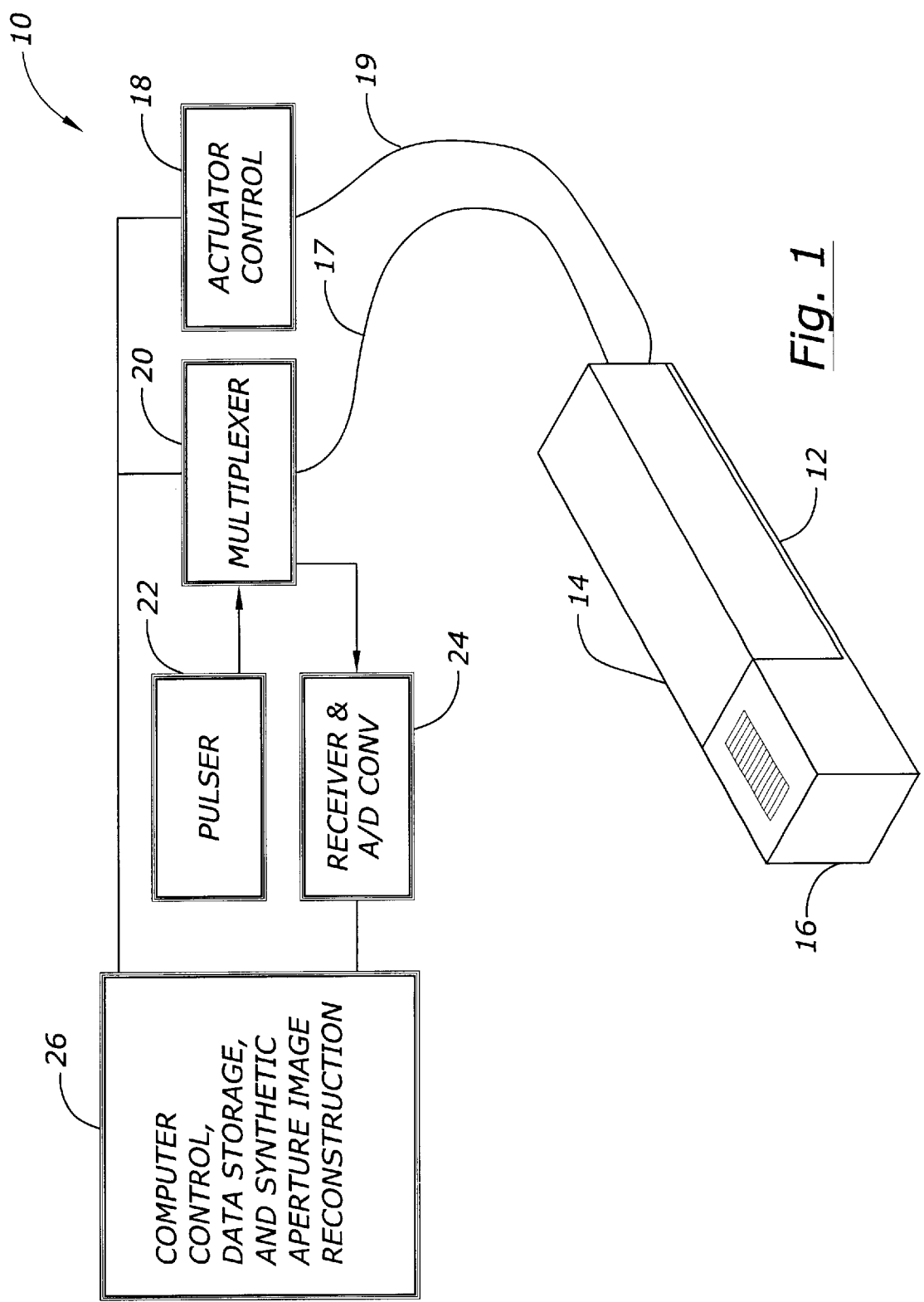
FIG. 1 is a block diagram of the actuated synthetic array according to one embodiment of the present invention.

In order to overcome the problems in the art, a motion mechanism is combined with an imaging array. Although an actuator is used in this embodiment, the present invention contemplates any number of other means of movement, including any other motion mechanism. Where an actuator is used, the actuator may be a piezoelectric actuator, a bimorph, or other actuator or motion mechanism. Further, the present invention contemplates that motion may be in one axis or in more than one axis. The imaging array used may be a one-dimensional array or a multi-dimensional array. FIG. 1 illustrates the system 10 of one embodiment of the present invention. In FIG. 1, an actuated synthetic array 12 is shown. The actuated synthetic array 12 includes an actuator 14 and a high frequency imaging array 16. The actuator 14 moves the array 16 in short, precise, incremental steps and enables an increased spatial sampling density.

The actuator 14 is electrically connected to the actuator control 18 through cable 19. The imaging array 16 is electrically connected to a multiplexer 20 with a coaxial cable 17. The actuator 14 moves the imaging array 16 through a variety of intermediate positions. At each of these intermediate positions, pulse-echo data is sampled. The pulser 22 is electrically connected to the multiplexer 20 to create and send the pulse. The receiver and analog-to-digital converter (A/D) 24 receives the echo data and sends the echo data to the control unit 26. The control unit 26 may be a computer or embedded computer. The control unit 26 provides for control functions, data storage, and synthetic aperture reconstruction.

Figure 2:
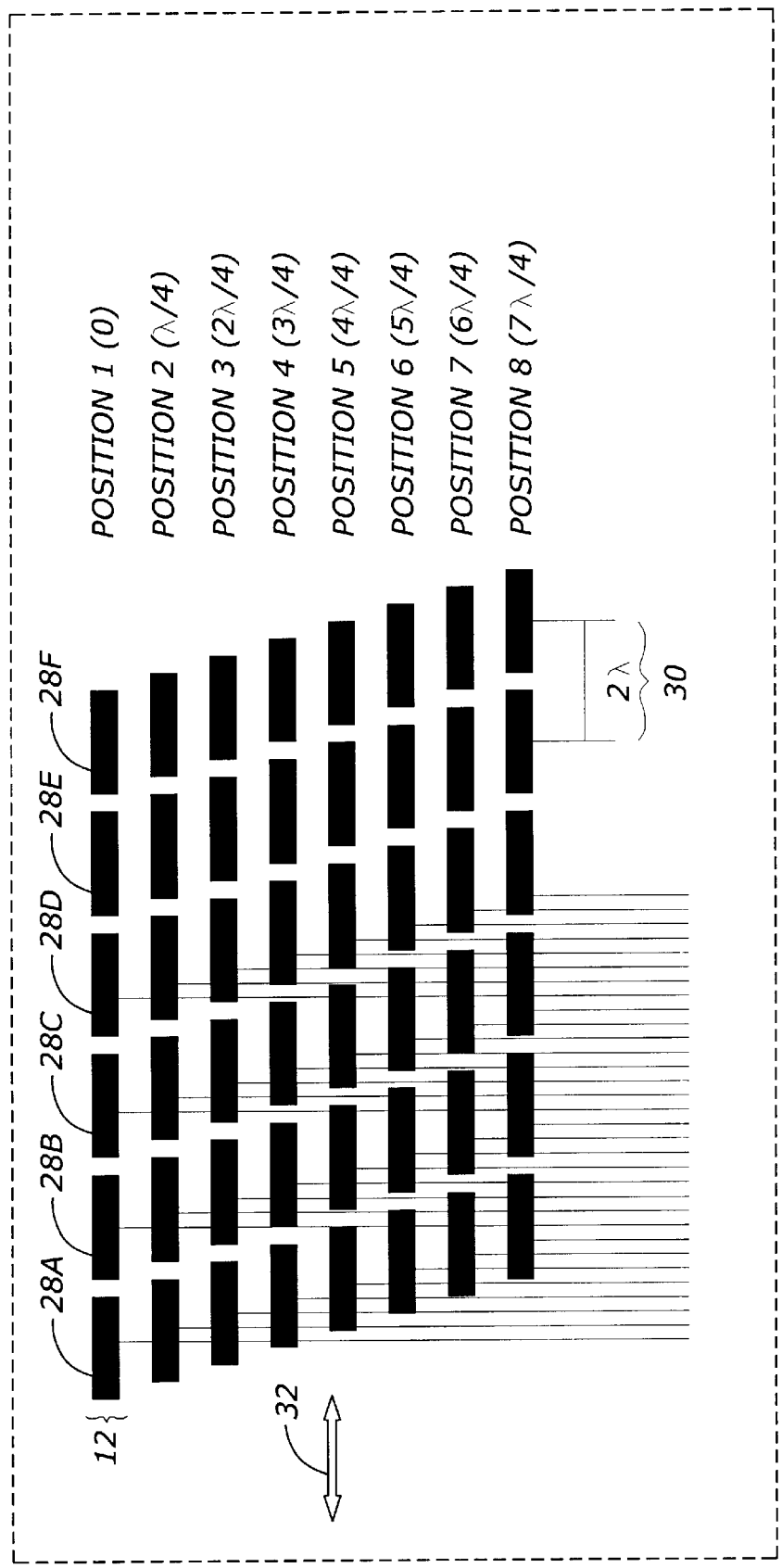
FIG. 2 is a diagram showing the spatial sampling according to one embodiment of the present invention.

Because an imaging array is used, instead of a single element, the required travel distance is less than the element pitch. This is shown in FIG. 2. In FIG. 2, a six element array 12 is shown with elements 28A, 28B, 28C, 28D, 28E, and 28F. The element-to-element spacing (pitch) 30 is set at twice the wavelength of the high frequency signal or $2\lambda$. In FIG. 2, eight different positions are shown for bi-directional motion of an actuator in the direction represented by arrow 32. The incremental distance or spatial sampling index 34 shown is one quarter of a wavelength or $\lambda/4$.

The total travel distance required by the actuator is equal to the difference between the element-to-element pitch 30 and the desired spatial sampling index 34. Since the travel distance is quite small, the actuated array can be coupled to tissue, as evidenced by the fact that single-element transducers in ultrasound backscatter microscopes routinely travel several millimeters when acquiring images. The data acquired at each element location is then used in a synthetic aperture algorithm employing either a monostatic (each element receives only its own transmit pulse) or multistatic (more than one element receives each transmit pulse) reconstruction method.

There are several advantages to using this hybrid approach. Imaging with arrays at frequencies above 30 MHz is possible because of the increase in allowable interconnect pitch and element width. As shown in FIG. 2, spatial sampling is increased without decreasing the element size or spacing. Active channel count and element count are reduced over a fully sampled array; in fact, only one channel is needed if a monostatic technique is used. The one channel can then be multiplexed to acquire the full set of radio frequency (RF) lines. The element count is reduced over a fully sampled array by a factor of (T+s)/s, where T is the travel of the actuator and s is the desired spatial sampling index. Thus there are numerous advantages gained with the present invention.

As shown in FIG. 1, the control unit 26 provides synthetic aperture image reconstruction. Synthetic aperture processing for ultrasound imaging is known in the art as it generally applies to ultrasound imaging. (C. H. Frazier and W. D. O'Brien, "Synthetic aperture techniques with a virtual source element," *IEEE Trans. on Ultr., Ferr., and Freq. Control,* vol. 45(1), pp. 96–207, 1998; J. T. Ylitalo and H. Ermert, "Ultrasound synthetic aperture imaging: monostatic approach," *IEEE Trans. on Ultr., Ferr., and Freq. Control,* vol. 41(3), pp. 333–341, 1994; P. D. Corl, P. M. Grant, and G. S. Kino, "A digital synthetic focus acoustic imaging system for NDE," 1978 *IEEE Ultrasonics Symposium,* pp. 263–266, 1978; M. L. Dick, D. E. Dick, F. D. McLeod, and N. B. Kindig, "Ultrasonic synthetic aperture imaging," *Acoustical Holography* Vol. 7: 327–346, 1977; G. R. Lockwood, J. R. Talman, and S. S. Brunke, "Real-time 3-D ultrasound imaging using sparse synthetic aperture beamforming," *IEEE Trans. on Ultr., Ferr., and Freq. Control*, vol. 45(4), pp. 980–988, 1998).

Figure 3:
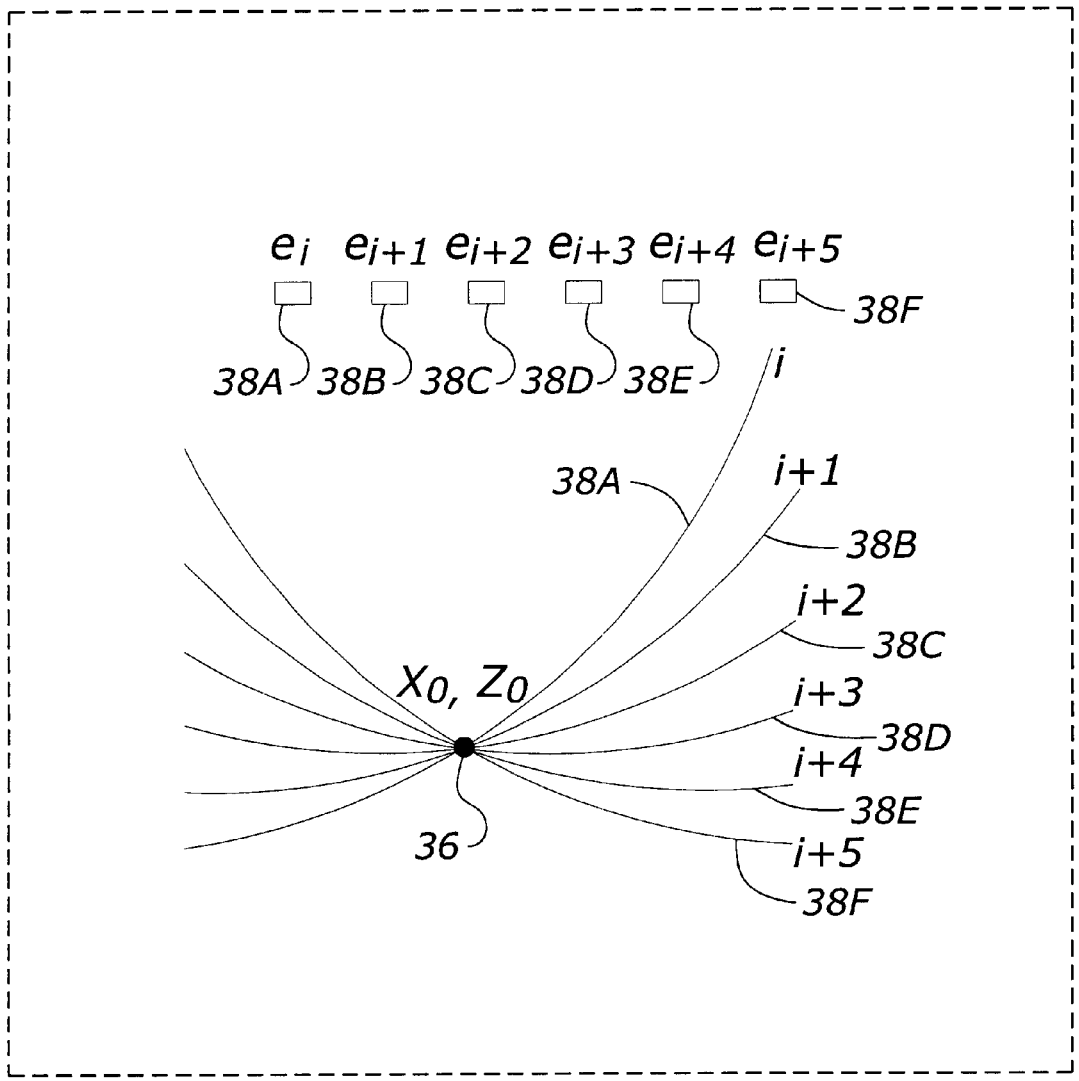
FIG. 3 is a diagram showing the monostatic synthetic aperture algorithm according to one embodiment of the present invention.

In one example of synthetic aperture imaging, image reconstruction can be accomplished in the time-domain using a backprojection technique. FIG. 3 illustrates how the monostatic synthetic aperture algorithm is used to reconstruct an image. The reconstruction method is described using an array of elements $e_1$ through $e_N$, where a single point target 36 is located at coordinate $x_o$, $z_o$ in object space. FIG. 3 includes six elements, $e_l$ 28A, $e_{l+1}$ 28B, $e_{l+2}$ 28C, $e_{l+3}$ 28D, $e_{l+4}$ 28E, and $e_{l+5}$ 28F. If each element 28 is used as a separate transmitter-receiver pair, the response for each element 28 is simply the pulse reflected by the point target 36. Assuming omni-directional response, the reflected pulses recorded for the elements are identical in amplitude and shape but shifted in time according to the distance from the element to the point. Backprojection is accomplished by summing contributions to each pixel in the time domain according to the relationship:

$$P(x_i, z_i) = \sum_{e=e1}^{e=eN} w_e R_e \left[ t - \frac{2}{c} * \sqrt{(x_e - x_o)^2 + z_o^2} \right] \quad (1)$$

where $x_i$, $z_l$ is the pixel location in image space, $w_e$ is the apodization, $R_e$ is the time-domain response, t is the time, c is the propagation velocity, and $x_e$ is the element position. One data point from each RF line contributes to each pixel in the beamformed image. From the perspective of a lone element, the actual position of the point is determined in terms of the "arc" 38 over which the point reflector may be located (G. S. Kino, *Acoustic Waves: Devices, Imaging, and Analog Signal Processing*, Prentice Hall, 1987). This concept is shown in FIG. 3 for six array elements, where each element has a corresponding arc 38A–38F. The arcs from each element will overlap in only one point, the actual position of the reflector. In some sense this process resembles a form of triangulation. By using many elements and forming a coherent sum, the entire image is mapped with minimal ambiguities.

For an aperture size of A and an object distance of z the transverse resolution (TR) is determined by the following relationship (R. N. Thomson, "Transverse and longitudinal resolution of the synthetic aperture focusing technique," *Ultrasonics*, vol. 32, pp. 9–15, 1994):

$$TR = \frac{\lambda z}{2A} \quad (2)$$

The aperture size A is limited by the number of elements capable of transmitting or receiving from the pixel of interest. A very large acceptance angle is desired when performing synthetic aperture imaging, since the number of pulse-echo positions used to reconstruct each image point is limited by the element directivity. A reconstruction angle θ, the angle where the one-way element response drops to a specified dB level, may be used as the cut-off to determine whether an element contributes to form the coherent sum for each image pixel. The previous equation can therefore be modified to obtain:

$$TR(ASA) = \frac{\lambda}{4 \tan\theta} \quad (3)$$

The element directivity also affects the size of the image, since beam steering will be limited.

In this manner, processing takes place so that an image is reconstructed from the data obtained from the actuated synthetic array according to one embodiment of the present invention.

Two potential limitations to the actuated synthetic array include increased side lobe levels and decreased signal-to-noise ratios (S/N). Acceptable side lobe levels may be achieved at the expense of main lobe width using apodization (C. H. Frazier and W. D. O'Brien, "Synthetic aperture techniques with a virtual source element," *IEEE Trans. on Ultr., Ferr., and Freq. Control*, vol. 45(1), pp. 96–207, 1998). Reduced S/N ratios do not present a severe obstacle, since the wide elements trade reduced angular response for increased transmit amplitude (J. T. Ylitalo and H. Ermert, "Ultrasound synthetic aperture imaging: monostatic approach," *IEEE Trans. on Ultr., Ferr., and Freq. Control*, vol. 41(3), pp. 333–341, 1994). The angular acceptance is still sufficient for high resolution imaging. The reduced electrical impedance of the wide elements also results in improved impedance matching to the electronics and reduced noise. Since only one channel is necessary, the highest quality components can be incorporated without concern for overall system cost (P. D. Corl, P. M. Grant, and G. S. Kino, "A digital synthetic focus acoustic imaging system for NDE," 1978 *IEEE Ultrasonics Symposium*, pp. 263–266, 1978). If necessary, the present invention contemplates that further improvement in signal-to-noise can be realized by receiving on multiple elements for each transmit event. Therefore, the present invention can compensate for the inherently low signal-to-noise ratios.

In developing the actuated approach, a 50 MHz actuated synthetic array (ASA) was analyzed for signal-to-noise ratio, resolution, sidelobe level, and simulated phantom imaging performance. For purposes of estimating signal-to-noise ratio, a number of assumptions are made. First, it is easiest to define signal-to-noise relative to a standard. A 50 MHz, 64-element phased array is selected as the reference. Note that such an array is beyond the capability of current manufacturing methods known to those skilled in the art. It is known in the art that relative signal-to-noise ratios can be found by assuming uncorrelated electrical noise (G. R. Lockwood, J. R. Talman, and S. S. Brunke, "Real-time 3-D ultrasound imaging using sparse synthetic aperture beamforming," *IEEE Trans.on Ultr., Ferr., and Freq. Control*, vol. 45(4), pp. 980–988, 1998; M. Karaman, P. C. Li, and M. O'Donnell, "Synthetic aperture imaging for small scale systems," *IEEE Trans on Ultr., Ferr., and Freg. Control*, vol. 42(3), pp. 429–442, 1995). For a phased array (PA), the relationship is $$S/N(PA) \propto 20 \log \lfloor Nt_{PA}(Nr_{PA})^{1/2} \rfloor \quad (4)$$

where Nt is the number of elements used for transmit and Nr is the number of receive elements per transmit event. For the ASA, the relative signal-to-noise is determined by the square root of the product of the number of transmit and receive channels.

$$S/N(ASA) \propto 20 \log(Nt_{ASA} \times Nr_{ASA})^{1/2} \quad (5)$$

Correction should be applied for differences in element width, where wider elements cause a reduction in beam divergence (and therefore increased signal amplitude) and decreased noise. Assuming a line source, the signal amplitude is proportional to the element width. The correction for noise assumes that Johnson noise, which is proportional to the square root of the element impedance (and therefore inversely proportional to the square root of the width), is the dominant noise source. Including these terms and dividing equation (5) by equation (4) results in a relative signal-to-noise ratio:

$$S/N \text{ (relative)} = 20 \log \left( \frac{(Nt_{ASA} \times Nr_{ASA})^{1/2} \times \left(\frac{w_{ASA}}{w_{PA}}\right)^{3/2}}{Nt_{PA}(Nr_{PA})^{1/2}} \right) \quad (6)$$

where $w_{ASA}$ and $w_{PA}$ refer to the widths of the synthetic aperture and phased array elements respectively.

Equations (2), (3), and (6) were used to analyze the performance of a representative 50 MHz ASA. The following table lists the important design parameters of both the ASA and the reference array. At 50 MHz, a wavelength in tissue is 30 microns, and a spatial sampling of 7.5 microns is desired. Given the 105 micron element pitch, a total actuator travel distance of 97.5 microns is needed.

| Parameter | Actuated synthetic array (ASA) | Phased array (PA) |
|---|---|---|
| Center frequency | 50 MHz | 50 MHz |
| Number of elements | 30 | 64 |
| Number of channels | 1 | 64 |
| Element-to-element pitch | 105 microns | 15 microns |
| Element width | 80 microns | 10 microns |
| Azimuth aperture | 3.2 mm | 0.96 mm |
| Elevation aperture | 0.8 mm | 0.8 mm |

In addition to the discrete relationships above, the FIELD II program (J. Jensen, "FIELD: A Program for Simulating Ultrasound Systems," *Medical & Biological Engineering and Computing,* vol. 34(1), pp. 351–353, 1996) was used to determine the three-dimensional point spread function for a representative ASA. A simulated 50 MHz ASA array was scanned across the image region using $\lambda/4$ spatial sampling and a 50% bandwidth impulse response. RF lines were acquired at a 1 GHz sampling rate and coherently summed at points in image space using a $\lambda/4$ pixel size. Point reflectors were imaged at two points located 4 mm axially from the face of the array, with one position along the array centerline and the other at the edge of the image region. Before forming the coherent sum the amplitude of each RF-line was corrected for element directivity, and Hanning apodization was applied during beamforming to reduce side lobe levels. The resolution was measured based on the full-width, half maximum (FWHM) of the main lobe. Sidelobe levels were determined from the amplitude of the first distinguishable peak apart from the main lobe.

The signal-to-noise ratios for five image points were calculated using equation (6), with results shown in the following table.

| Position in image space | S/N ratio (ASA/PA) | Resolution (equation 2) |
|---|---|---|
| A (1 mm axial, centerline) | −10 dB | 42 μm |
| B (2 mm axial, centerline) | −7 dB | 42 μm |
| C (4 mm axial, centerline) | −4 dB | 42 μm |
| D (6 mm axial, centerline) | −3 dB | 42 μm |
| E (4 mm axial, 1.6 mm off center) | −7 dB | 85 μm |

The image width was the width of the array (3.2 mm), while the image depth extended from 1 mm to 6 mm. The actuated array uses an interconnect pitch and element width that can easily be achieved. The pitch and element width of the phased array are beyond current fabrication capabilities. A 10° reconstruction angle θ was assumed for all points, resulting in larger numbers of elements being used for more distal points in the image. The S/N ratio for more distal points is therefore improved. In all cases the S/N ratios for the ASA are within 10 dB of the values predicted for the phased array. More importantly, the actuated synthetic array (ASA) only requires 30 elements, while the phased array (PA) has 64 elements. Although this reduction in the number of elements is not remarkable, the PA requires 64 channel electronics (with time delays) for beamforming, while the ASA requires only one channel (without time delays) and a multiplexer.

If a larger reconstruction angle is used the relative S/N will increase, although element directivity must be taken into account. A further increase in transmit amplitude is also possible with a synthetic array, since the excitation of individual elements results in a low intensity, diverging beam. This is in contrast to the phased array, which displays high transmit intensities near the focus. The small element size for the phased array points to difficulties with electrical impedance matching, complex acoustic impedances, and low element capacitance. All of these factors are in favor of the ASA design. Signal averaging may also be possible, further enhancing the signal-to-noise ratio. In summary, the S/N ratio of the indexed synthetic array will approach that of a conventional phased array system, and may exceed it if transmit amplitudes are increased and averaging is used.

The image resolution was also estimated for the five image points using equation (2) and (3). An angle of 10° (without apodization) was assumed. The use of a fixed reconstruction angle resulted in consistent resolution for points along the image centerline, since the quantity z/A remained constant. For the off-axis point, the active aperture was truncated by a factor of two due to the limited extent of the array.

The anticipated tradeoffs between main lobe width and side lobe level were evident in the plots of the 3-D point spread functions. The following table lists the amplitudes of the side lobes as well as the main lobe widths for one on-axis (point C) and one off-axis (point E) image point. A reconstruction angle of 19° (the −12 dB point in the one-way angular response) was used for maximum aperture size and highest resolution, since the Hanning apodization increased the main lobe width considerably. Reconstruction angles significantly larger than this become impractical due to pulse distortion resulting from the frequency dependent angular response. The beam widths demonstrate resolution comparable to the values calculated using equation (2) with a 10° reconstruction and no apodization. The side lobe levels for points within the majority of the image are similar to those observed for single-element transducers (−35 dB), and contrast with the ASA should be comparable to that observed for single-element ultrasonic backscatter microscope (UBM) systems. In summary, beam widths from 50 to 100 microns (depending on the position within the image) and low side lobes can be realized.

| Image Point | Sidelobe level | Main lobe width |
| --- | --- | --- |
| Point C (4 mm axial, centerline) | −39 dB | 52 µm |
| Point E (4 mm axial, 1.6 mm off center) | −34 dB | 98 µm |

Figure 4:
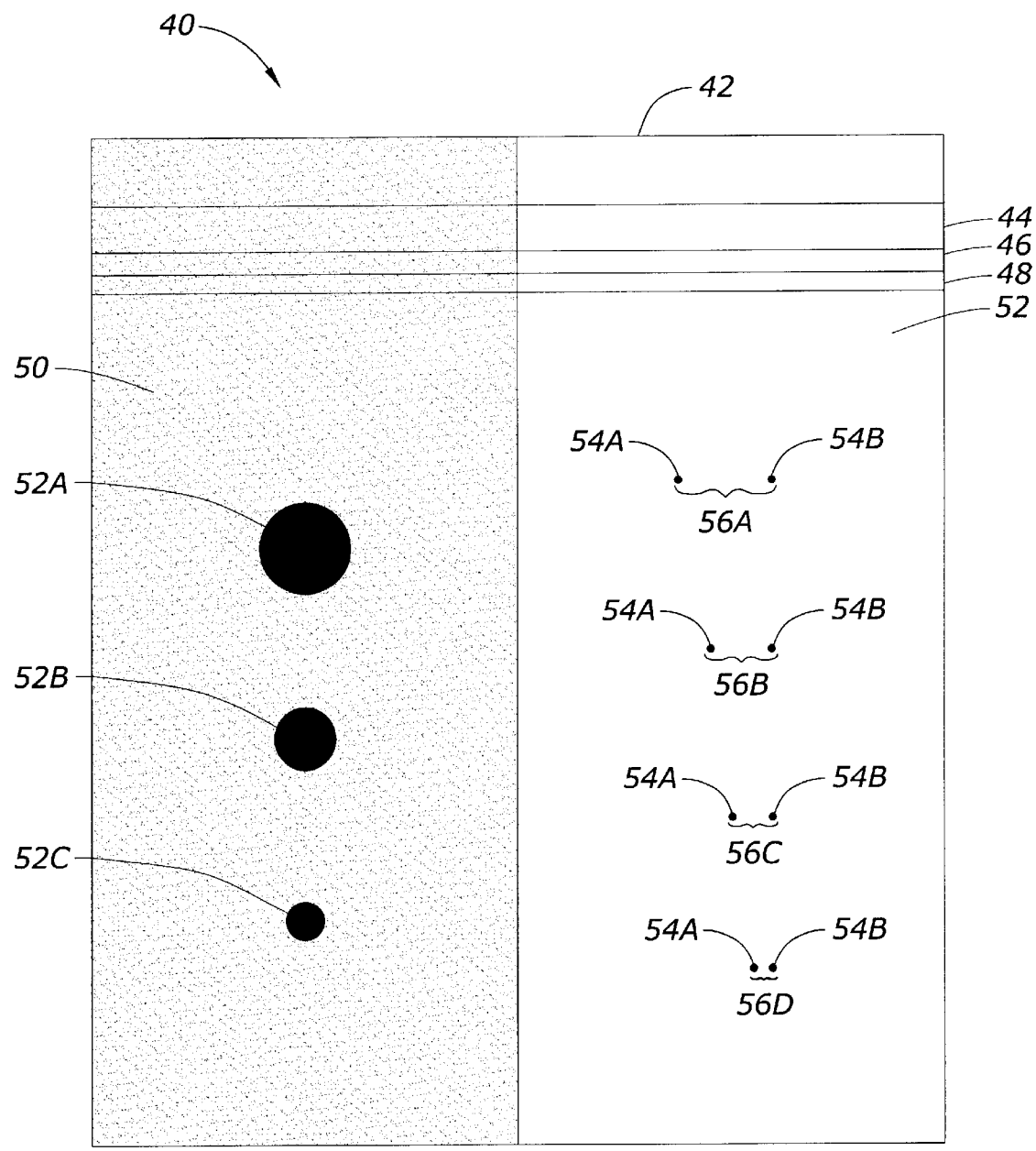
FIG. 4 is a diagram showing a phantom used to simulate performance of one embodiment of the present invention.

In addition to simulating the point spread function, the FIELD II program was used to simulate imaging the phantom shown in FIG. 4. The phantom incorporated regions of random scatterers to generate speckle, several point targets spread laterally and axially throughout the depth of field, cyst regions, and lines of scatterers designed to simulate closely spaced tissue interfaces as observed in the skin or the cornea. The phantom was designed with a mean tissue attenuation of 3 dB/mm at 50 MHz and a frequency dependent value of 0.08 dB/(mm MHz), values similar to those reported for ciliary muscle and blood. Time gain compensation was used to both compensate for attenuation in an average sense and account for diffraction. Individual RF-lines were again corrected for element directivity, and Hanning apodization was applied during beamforming. The resulting images were displayed over a 50 dB dynamic range using 50 gray levels.

As shown in FIG. 4, the phantom 40 has a scattering region 50. Within the scattering region 50 are cysts 52 of varying sizes. Cyst 52A has a diameter of 0.6 mm. Cyst 52B has a diameter of 0.4 mm. Cyst 52C has a diameter of 0.2 mm. In region 52, a number of sets of point targets 54 are shown, the point targets separated by a distance of 56. Distance 56A is 400 µm. Distance 56B is 200 µm. Distance 56C is 100 µm. Distance 56D is 50 µm.

Figure 5:
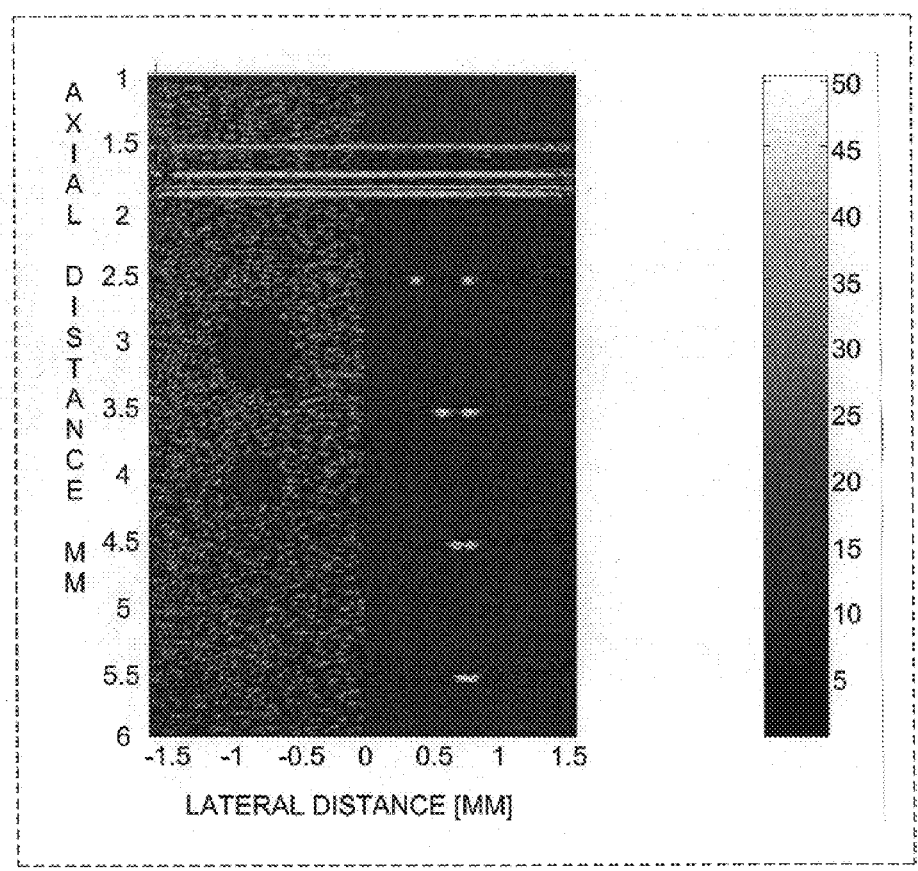
FIG. 5 is a diagram showing the simulated results using the phantom.

The simulated image of the phantom is shown in FIG. 5. The point targets separated laterally by 50 microns cannot be distinguished, as expected from the main lobe widths previously presented. The lines of scatterers (interfaces) are all distinguishable, including the ones spaced only 50 µm apart. This good axial resolution is a result of the high absolute bandwidth of 25 MHz and the lack of range side lobes in the reconstruction algorithm. The borders of all cysts are clear and the interior regions appear anechoic.

The actuator can be moved either incrementally or continuously. Incremental movement results in well-defined element locations if position sensing and closed-loop feedback are incorporated, but actuator acceleration/deceleration may significantly increase the time required to obtain the image. It is contemplated that certain applications will be sensitive to motion artifacts, mandating the shortest possible data acquisition time. Continuous movement of the actuator may therefore be implemented. Under the condition of continuous movement, pulse-echo data pairs will be collected while the array is translating. Any of a number of control architectures can initiate pulsing and receiving on each element at the appropriate times.

Assuming an N element array connected to an actuator which travels a linear distance T, a simple computational correction for the element position x(i, j) can be used during the reconstruction process.

$$i = \text{element number (integer from 1 to N)} \tag{7}$$

$$j = \text{actuator position (integer from 1 to p/s)} \tag{8}$$

$$x(i,j) = x_0 + (i-1)p + (i-1)tu + (j-1)s \tag{9}$$

where p is the element to element pitch, u is the velocity of the actuator, t is the time needed to acquire one RF line, and s is the desired spatial sampling index. Because of the shift caused by the actuator movement, the actual spatial sampling index will be slightly greater than the desired value s, but this deviation is easily accommodated. The minimum time needed to acquire one RF line is determined by the extent of the image along the z-axis (the imagedepth) according to:

$$t = \frac{imagedepth \times 2}{1540\,(m/s)} \tag{10}$$

Equation (10) assumes a sound propagation velocity of 1540 m/s. The minimum time required to obtain the entire dataset for one frame of an image is therefore:

$$\text{Time\_for\_one\_frame} = t \times N \times \frac{p}{s} \tag{11}$$

For the 30 element array example described, the time to acquire one frame of data in a 6 mm deep image region is only 3.3 msec.

Only one possible implementation of the ASA approach is described. Since there are a number of tradeoffs involved each application may require a unique configuration. For example, a larger array could scan a wider field with minimum additional complexity, since only the number of array elements needs to be increased. If higher resolution is desired, smaller elements with increased angular response will allow a larger aperture size to be used during reconstruction. The resultant decrease in sensitivity may be partially compensated by increasing the transmit amplitude. Of course, different imaging algorithms may also be used.

In addition the effects of tissue motion and/or phase aberration can be compensated for if necessary. For example, it is known in the art shown that axial motion caused by tissue motion can degrade image quality, but that correction can be applied using correlation of adjacent A-lines or other methods (L. F. Nock and G. E. Trahey, "Synthetic receive aperture imaging with phase correction for motion and for tissue inhomogeneities-part II: effects of and correction for motion," *IEEE Trans. on Ultr., Ferr., and Freq. Control.*, vol. 39(4), pp. 489–495, 1992). Furthermore, synthetic aperture techniques have been applied successfully to intravascular applications at 20 MHz frequencies even given the problems of phase aberration and motion (M. O'Donnell, B. M. Shapo, M. J. Eberle, and D. N. Stephens, "Experimental studies on an efficient catheter array imaging system," *Ultrasonic Imaging*, vol. 17, pp. 83–94, 1995; M. O'Donnell, M. J. Eberle, D. N. Stephens, J. L. Litzza, B. M. Shapo, J. R. Crowe, C. D. Choi, J. J. Chen, D. M. W Muller, J. A. Kovach, R. L. Lederman, R. C. Ziegenbein, C. C. Wu, K. SanVincente, and D. Bleam, "Catheter arrays: can intravascular ultrasound make a difference in managing coronary artery disease," *Proceedings of the 1997 IEEE Ultrasonics Symposium*, pp. 1447–1456, 1997).

A high frequency synthetic ultrasound device and method have now been disclosed. The present invention contemplates numerous variations including those mentioned; the type of motion mechanism; the type of actuator when an actuator is used; the configuration of the elements, including configuration in an array of one or more dimensions; the motion being either continuous or in discrete steps; the motion being along one or more of the axes; the number of channels used; the frequency used; the reconstruction methods used; and other variations within the spirit and scope of the invention.

What is claimed is:

1. A device for ultrasound imaging wit waves at a frequency and having wave length with improved spatial sampling comprising:

a plurality of ultrasound imaging elements each having a center and the ultrasound imaging elements having a pitch defined by a center to center spacing of the ultrasound imaging elements;

a motion mechanism operatively connected to the plurality of ultrasound imaging elements and adapted to linearly move the plurality of ultrasound imaging elements over a distance to increase the spatial sampling of the plurality of ultrasound imaging elements;

the pitch being at least 0.5 wavelengths;

the distance being limited to approximately the pitch.

2. The device of claim 1 wherein the distance is a series of incremental steps.

3. The device of claim 1 wherein the motion mechanism is adapted for continuous movement over the distance.

4. The device of claim 1 wherein the frequency is greater than approximately 30 MHz.

5. The device of claim 1 wherein the frequency is greater than approximately 50 MHz.

6. The device of claim 1 further comprising a control unit operatively connected to the motion mechanism for controlling the movement of the motion mechanism and to the plurality of ultrasound imaging elements for communicating pulse and echo information.

7. The device of claim 6 wherein the control unit is adapted to apply a synthetic aperture algorithm.

8. The device of claim 1 wherein the motion mechanism is an actuator.

9. The device of claim 1 wherein the plurality of imaging elements is an array of imaging elements.

10. The device of claim 9 wherein the array of imaging elements is a linear array of imaging elements.

11. The device of claim 9 wherein the array of imaging elements is a multi-dimensional array of imaging elements.

12. A method of ultrasound imaging using waves having a frequency and a wavelength comprising:

(a) transducing a signal from an ultrasound imaging element within an array of ultrasound imaging elements, the ultrasound imaging element having a pitch defined by a center to center spacing of the ultrasound imaging element with an adjacent ultrasound imaging element the pitch being at least 0.5 wavelengths;

(b) linearly moving the array of ultrasound imaging elements a distance to increase the spatial sampling of the array the distance being limited to approximately equal to or less than the pitch; and (c) transducing at least one additional signal from the ultrasound imaging element.

13. The method of claim 12 wherein the distance comprises one or more incremental distances.

14. The method of claim 13 wherein the step of transducing is simultaneous with the step of moving.

15. The method of claim 13 further comprising applying synthetic aperture reconstruction.

16. An ultrasound imaging apparatus for high spatial resolution at a high frequency comprising:

(a) an array comprising a plurality of linearly arranged ultrasound transducer elements, the elements having an element-to-element pitch that is larger than 0.5 wavelengths;

(b) a motion mechanism operatively associated with the array and adapted to linearly move the array over an aggregate distance less than the element-to-element pitch for the expressed purpose of increasing the spatial sampling.

17. The apparatus of claim 16 wherein the motion mechanism is an actuator.

18. The apparatus of claim 17 wherein the actuator is a piezoelectric stack.

19. The apparatus of claim 18 wherein the actuator is a bimorph.

20. The apparatus of claim 16 wherein the motion mechanism is adapted to incrementally move the array from spatial sampling location to spatial sampling location.

21. The apparatus of claim 16 wherein the motion mechanism is adapted to continuously move the array.

22. The apparatus of claim 16 wherein each element has a width maximized for the high frequency.

23. The apparatus of claim 16 wherein the motion mechanism is adapted to incrementally move the array less than an overall sampling aperture used for imaging with the array.

24. The apparatus of claim 16 wherein the motion mechanism is adapted to incrementally move the array.

25. The apparatus of claim 16 wherein motion mechanism is adapted to continuously move the array.

26. The apparatus of claim 16 further comprising a processor having software to control pulse/echo of the elements through a channel.

27. The apparatus of claim 16 further comprising a processor having software to apply a synthetic aperture algorithm on the echoes received from the array when forming the image from the array.

28. The apparatus of claim 16 further comprising a a) coaxial cable in electrical communication with each element of the array, (b) a multiplexer attached to the coaxial cable, (c) an ultrasound pulser, (d) an ultrasound receiver, (e) an actuator control, and (f) a processing device.

29. The apparatus of claim 16 wherein the high frequency is approximately 30 MHz or greater.

30. The apparatus of claim 16 wherein the high frequency is approximately 50 MHz or greater.

31. A method for ultrasound imaging at a frequency with wave having a wavelength to reduce artifact caused by grating lobes and noise that hide pathology, comprising:

coupling to tissue an array of ultrasound imaging elements for each ultrasound imaging element having a pitch defined by a center to center spacing of each ultrasound imaging element with an adjacent ultrasound imaging element, the pitch being larger than 0.5 wavelengths, transducing a signal from each ultrasound imaging element;

linearly moving the array of ultrasound imaging elements a distance less than the pitch to increase the spatial sampling of the array;

transducing at least one additional signal from each ultrasound imaging element;

reconstructing an image using synthetic aperture processing.

* * * * *

UNITED STATES PATENT AND TRADEMARK OFFICE
CERTIFICATE OF CORRECTION

PATENT NO. : 6,679,845 B2
DATED : January 20, 2004
INVENTOR(S) : Timothy Adam Ritter, K. Kirk Shung and Thomas R. Shrout It is certified that error appears in the above-identified patent and that said Letters Patent is hereby corrected as shown below:

Column 11,
Line 2, should read: -- A device for ultrasound imaging with waves at a frequency --

Signed and Sealed this

Twenty-third Day of March, 2004

JON W. DUDAS
*Acting Director of the United States Patent and Trademark Office*